(12) United States Patent
Ma et al.

(10) Patent No.: US 8,363,536 B2
(45) Date of Patent: *Jan. 29, 2013

(54) OFDM CHANNEL ESTIMATION

(75) Inventors: Xiaoqiang Ma, Newtown, PA (US); Azzedine Touzni, Doylestown, PA (US)

(73) Assignee: QUALCOMM Incorporated, San Diego, CA (US)

( * ) Notice: Subject to any disclaimer, the term of this patent is extended or adjusted under 35 U.S.C. 154(b) by 954 days.

This patent is subject to a terminal disclaimer.

(21) Appl. No.: 11/467,730

(22) Filed: Aug. 28, 2006

(65) Prior Publication Data

US 2008/0049598 A1 Feb. 28, 2008

(51) Int. Cl.
*H04J 11/00* (2006.01)
*H04L 27/00* (2006.01)
*H04L 25/00* (2006.01)
*H04K 1/10* (2006.01)

(52) U.S. Cl. ......... 370/208; 375/259; 375/260; 375/371

(58) Field of Classification Search .................. 370/329, 370/330, 341, 343, 332, 333, 334, 210, 208, 370/203, 281, 295, 302; 375/148, 260, 341, 375/346

See application file for complete search history.

(56) References Cited

U.S. PATENT DOCUMENTS

| | | | |
|---|---|---|---|
| 5,978,416 A | 11/1999 | Watanabe et al. | |
| 6,327,314 B1 | 12/2001 | Cimini et al. | |
| 6,381,229 B1 | 4/2002 | Narvinger et al. | |
| 6,654,408 B1 * | 11/2003 | Kadous et al. | 375/148 |
| 6,768,713 B1 * | 7/2004 | Siala et al. | 370/203 |
| 7,027,530 B2 * | 4/2006 | McFarland et al. | 375/341 |
| 7,050,511 B2 * | 5/2006 | Jeong et al. | 375/301 |
| 7,412,005 B2 * | 8/2008 | Wang et al. | 375/260 |
| 2001/0028637 A1 | 10/2001 | Abeta et al. | |
| 2002/0186796 A1 | 12/2002 | McFarland et al. | |
| 2003/0081695 A1 | 5/2003 | Eilts et al. | |
| 2004/0005010 A1 | 1/2004 | He et al. | |

(Continued)

FOREIGN PATENT DOCUMENTS

| | | |
|---|---|---|
| JP | 2003509963 A | 3/2003 |
| JP | 2006222836 A | 8/2006 |

(Continued)

OTHER PUBLICATIONS

Athaudage et al., "Enhanced MMSE channel estimation using timing error statistics for wireless OFDM systems", *IEEE Transactions on Broadcasting*, 50(4):369-376 (Dec. 2004).

(Continued)

*Primary Examiner* — Nittaya Juntima
*Assistant Examiner* — Samina Choudhry
(74) *Attorney, Agent, or Firm* — Charles Chesney (57) ABSTRACT

A receiver for receiving an orthogonal frequency division multiplexed (OFDM) digital video broadcast (DVB) signal including OFDM symbol sets including data symbols and pilot symbols transmitted using a plurality of sub-carriers, the OFDM DVB signal being transmitted toward the receiver via a transmission channel, the receiver including an input module configured to receive the OFDM DVB signal via the transmission channel, and a channel estimation module coupled to the input module and configured to calculate channel estimates of the transmission channel by performing Fourier transforms on the OFDM symbol sets to produce transformed symbol sets in the frequency domain and by performing minimum mean square error (MMSE) equalization on the transformed symbol sets using a sub-set of the pilot symbols in the OFDM DVB signal.

45 Claims, 5 Drawing Sheets

U.S. PATENT DOCUMENTS

| | | | |
|---|---|---|---|
| 2005/0105647 | A1 | 5/2005 | Wilhelmsson et al. |
| 2005/0135509 | A1 | 6/2005 | Mantravadi et al. |
| 2005/0147025 | A1 | 7/2005 | Auer |
| 2005/0185724 | A1 | 8/2005 | Wang et al. |
| 2007/0127602 | A1* | 6/2007 | Guey .......................... 375/340 |
| 2009/0201978 | A1* | 8/2009 | Tonsing et al. ............... 375/224 |

FOREIGN PATENT DOCUMENTS

| | | |
|---|---|---|
| RU | 2004105946 | 7/2005 |
| RU | 2005106874 | 8/2005 |
| WO | WO2005117377 | 12/2005 |
| WO | WO 2005117377 A1 * | 12/2005 |
| WO | WO2006086786 A1 | 8/2006 |

OTHER PUBLICATIONS

Chen et al., "Intercarrier interference suppression and channel estimating for OFDM systems in time-varying frequency-selective fading channels", *IEEE Transactions on Consumer Electronics*, 50(2):429-435 (May 2004).

Choi et al., "On channel estimation and detection for multicarrier signals in fast and selective Rayleigh fading channels", *IEEE Transactions on Communications*, 49(8):1373-1387 (Aug. 2001).

Edfors et al., "OFDM channel estimation by singular value decomposition", *IEEE Transactions on Communications*, 46(7):931-939 (Jul. 1998).

Fischer et al., "ICI reduction method of OFDM systems", 8th International OFDM-Workshop 2003 (InOWo'03).

Gorokhov, A., "Robust OFDM receivers for dispersive time-varying channels: equalization and channel acquisition", *IEEE Transactions on Communications*, 52(4):572-583 (Apr. 2004).

Hoeher et al., "Two-dimensional pilot-symbol-aided channel estimation by wiener filtering", ICASSP 1997, 3:1845-1848 (Apr. 1997).

Jeon et al., "An equalization technique for orthogonal frequency-division multiplexing systems in time-variant multipath channels", *IEEE Transactions on Communications*, 47(1):27-32 (Jan. 1999).

Li et al., "Robust channel estimation for OFDM systems with rapid dispersive fading channels", *IEEE Transactions on Communications*, 46(7):902-915 (Jul. 1998).

Li et al., "A low-complexity equalization technique for OFDM system in time-variant multipath channels", VTC 2003-Fall, 4:2466-2470 (Oct. 2003).

Mostofi et al., "ICI mitigation for mobile OFDM receivers", ICC 2003, 5:3351-3355 (May 2003).

Necker et al., "An adaptive wiener-filter for improved channel estimation in mobile OFDM-systems", *IEEE International Symposium on Signal Processing and Information Technology*, ISSOIT 2001, Cairo, pp. 213-216 (2001).

Schniter, P., "Low-complexity equalization of OFDM in doubly selective channels", *IEEE Transactions on Signal Processing*, 52(4):1002-1011 (Apr. 2004).

Schober et al., "Adaptive channel estimation for OFDM based high speed mobile communication systems", *2001 International Conference on Third Generation Wireless and Beyond*, pp. 392-397 (2001).

Song et al., "Pilot-symbol aided channel estimation for OFDM with fast fading channels", *IEEE Transactions on Broadcasting*, 49(4):398-402 (Dec. 2003).

Stamoulis et al., "Intercarrier interference in MIMO OFDM", *IEEE Transactions on Signal Processing*, 50(10):2451-2464 (Oct. 2002).

Tomasin et al., "Iterative interference cancellation and channel estimation for mobile OFDM", *IEEE Transactions on Wireless Communications*, 4(1):238-245 (Jan. 2005).

Athaudage et al., "Enhanced MMSE Channel Estimation Using Timing Error Statistics for Wireless OFDM Systems", IEEE Transactions on Broadcasting, 50(4):369-376, (Dec. 2004).

Chen et al., "Intercarrier Interference Suppression and Channel Estimating for OFDM Systems in Time-Varying Frequency-Selective Fading Channels", IEEE Transactions on Consumer Electronics, 50(2):429-435, (May 2004).

Choi et al., "On Channel Estimation and Detection for Multicarrier Signals in Fast and Selective Rayleigh Fading Channels", IEEE Transactions on Communications, 49(8):1373-1387, (Aug. 2001).

Edfors et al., "OFDM Channel Estimation by Singular Value Decomposition", IEEE Transactions on Communications, 46(7):931-939, (Jul. 1998).

Gorokhov, "Robust OFDM Receiers for Dispersive Time-Varying Channels: Equalization and Channel Acquisition", IEEE Transactions on Communications, 52(4):572-583, (Apr. 2004).

Hoeher et al., "Two-Dimensional Pilot-Symbol-Aided Channel Estimation by Wiener Filtering", ICASSP 1997, 3:1845-1848, (Apr. 1997).

Jeon et al., "An Equalization Technique for Orthogonal Frequency-Division Multiplexing Systems in Time-Variant Multipath Channels", IEEE Transactions on Communications, 47(1):27-32, (Jan. 1999).

Li et al., "A Low-Complexity Equalization Technique for OFDM Systems in Time-Variant Multipath Channels", VTC 2003-Fall, 4:2466-2470, (Oct. 2003).

Li et al., "Robust Channel Estimation for OFDM Systems With Rapid Dispersive Fading Channels", IEEE Transactions on Communications, 46(7):902-915, (Jul. 1998).

Mostifi et al., "ICI Mitigation for Mobile OFDM Receivers", ICC 2003, 5:3351-3355, (May 2003).

Necker et al., "An Adaptive Wiener-Filter for Improved Channel Estimation in Mobile OFDM-Systems", IEEE International Symposium on Signal Processing and Information Technology, ISSOIT 2001, pp. 213-216, (Cairo, 2001).

Sandell et al., "A Comparative Study of Pilot-Based Channel Estimators for Wireless OFDM", Research Report TUlea, Division of Signal Processing, No. 19, pp. 5-34, (Sep. 1, 1996).

Schniter, "Low-Complexity Equalization of OFDM in Doubly Selective Channels", IEEE Transactions on Signal Processing, 52(4):1002-1011, (Apr. 2004).

Schober et al., "Adaptive Channel Estimation for OFDM Based Hih Speed Mobile Communication Systems", 2001 International Conference on Third Generation Wireless and Beyond, pp. 392-397, (2001).

Song et al., "Pilot-Symbol Aided Channel Estimation for OFDM with Fast Fading Channels", IEEE Transactions on Broadcasting, 49(4):398-402, (Dec. 2003).

Stamoulis et al., "Intercarrier Interference in MIMO OFDM", IEEE Transactions on Signal Processing, 50(10):2451-2464, (Oct. 2002).

Tomasin et al., "Iterative Interference Cancellation and Channel Estimation for Mobile OFDM", IEEE Transactions on Wireless Communications, 4(1):238-245, (Jan. 2005).

Fernandez-Getino Garcia M J et al., "Pilot patterns for channel estimation in OFDM," Electronics Letters, IEEE Stevenage, GB, vol. 36, No. 12, Jun. 8, 2000, pp. 1049-1050, XP006015292.

International Search Report and Written Opinion—PCT/US2007/078480, International Search Authority—European Patent Office—Apr. 16, 2008.

International Search Report and Written Opinion—PCT/US2007/018856, International Search Authority—European Patent Office—May 16, 2008.

* cited by examiner

OFDM CHANNEL ESTIMATION

BACKGROUND

Today, many forms of information are sent from information sources, such as television content providers, to receivers, such as televisions in people's homes. Thus, an example of such information is digital television (DTV) information. Transmitting digital information typically involves converting the digital information to an analog signal and modulating an RF (radio frequency) carrier frequency's amplitude and/or phase using the analog signal, and sending the modulated signal over a propagation medium, such as air, towards a receiver.

Figure 1:
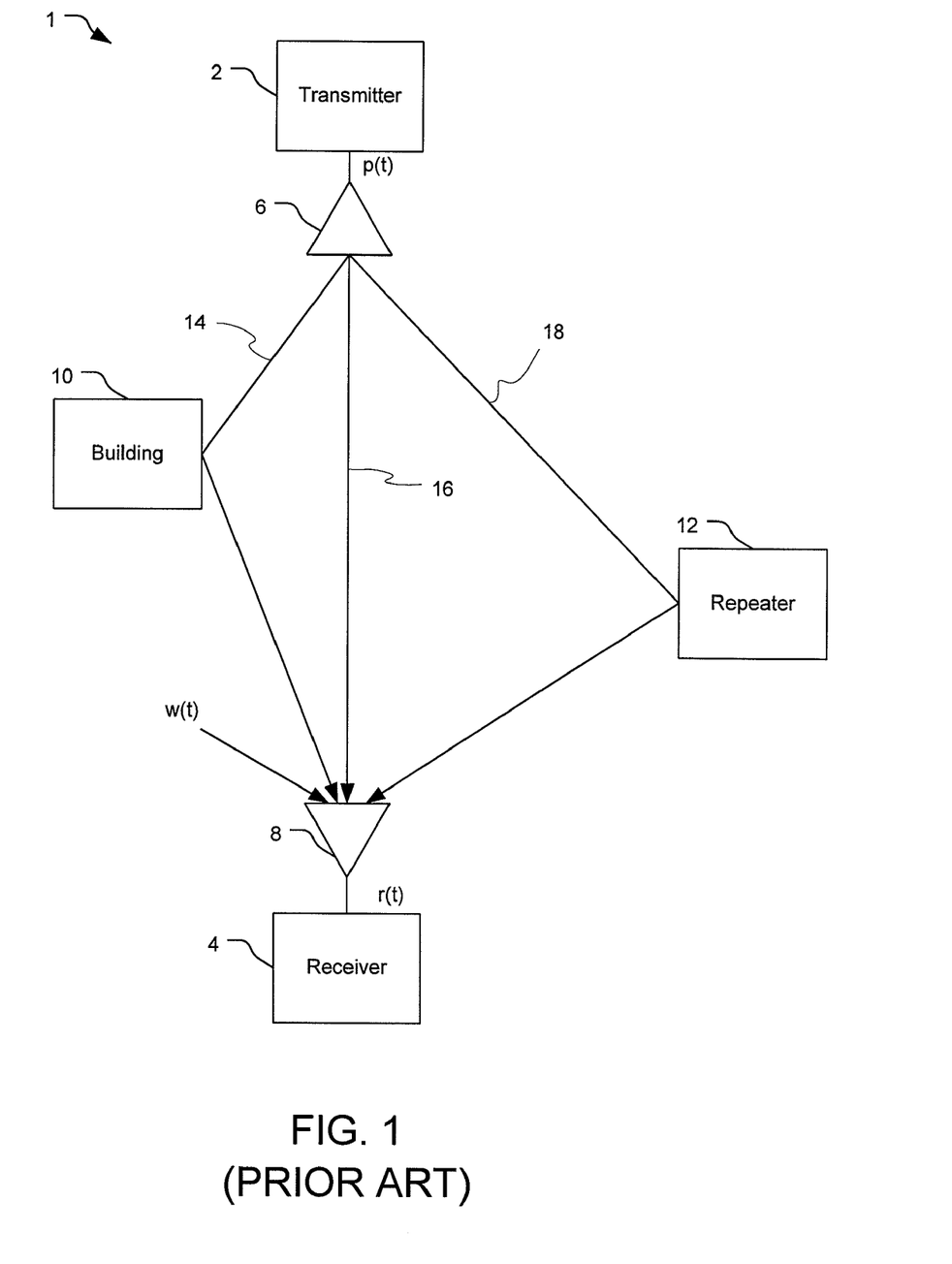
FIG. 1 is a schematic diagram of a transmission channel.

Referring to FIG. 1, a communications system 1 includes a transmitter 2 and a receiver 4. The transmitter 2 and the receiver 4 have respective antennas 6 and 8, here shown externally to the transmitter 2 and the receiver 4, although the antennas 6 and 8 may be considered to be parts of the transmitter 2 and the receiver 4. The transmitter 2 is configured to send information over the propagation medium, here a terrestrial broadcast system, to the receiver 4 (e.g., as signals 14, 16, and 18). Transmitting information over the propagation medium introduces signal distortion caused by noise (e.g., static), strength variations (fading), phase shift variations, Doppler spreading, Doppler fading, multiple path delays, etc. Multiple path delays result from the transmitted signals taking different paths between the transmitter and receiver through the propagation medium, e.g., due to reflections off a building 10 and/or being relayed through a repeater station 12. Different paths of a transmitted signal p(t) (e.g., the signals 14, 16, and 18) result in different gains and different delay times that cause time-delayed copies of the signal p(t) to arrive at different times at the receiver 4 (like an echo) compared to the directly-transmitted signal 16. The received signal r(t) is a combination of the directly-transmitted signal and/or the replicas, if any. Multi-path distortion results in intersymbol interference (ISI) in which weighted contributions of other symbols are added to the current symbol, and/or interchannel interference in which separate sub-carriers interfere with each other. Noise and/or interference in the signal r(t) can also come from other sources such as the transmitter. These effects can cause errors in the transfer and/or interpretation of information from the transmitter 2 to the receiver 4. When a bit error rate (BER) of a system exceeds a threshold and overcomes the error tolerance of the system, the system fails.

Orthogonal Frequency Division Multiplexing (OFDM) can be used to transmit multiple DTV signals over the propagation medium. OFDM systems transmit a signal, such as a television signal, in parallel over one or more sub-carriers, using one or more time slots in each sub-carrier. Each sub-carrier is located at a different portion of a frequency spectrum used to transmit the DTV signals. The spacing of the sub-carriers is such that each sub-carrier's frequency is orthogonal to each of the other sub-carriers' frequencies (e.g., frequency spacing of the sub-carriers is substantially equal to the inverse of an OFDM symbol duration). The orthogonality of the sub-carrier frequencies provides a higher resistance to RF interference and multi-path distortion than when non-orthogonal frequencies are used as sub-carriers. Each sub-carrier includes, for example, data symbols, pilot symbols, and/or Transmission Parameter Signals (TPS) symbols, which are a special type of data symbol. The pilot symbols are predetermined known signals used to help a receiver estimate transmission channels.

Once an OFDM signal (e.g., r(t)) is received by the receiver 4, channel estimation is used to cancel the effects of the distortion on the transmitted signal (e.g., p(t)). For example, because r(t) is a linear combination of the signals 14, 16, and 18, a specific mathematical function (i.e., a transfer function) can describe the relation of p(t) to r(t). Once the transfer function of the propagation medium is known, a filter that is the inverse of the transfer function of the propagation medium can be used to reduce the effects of the distortion introduced by the propagation medium. Because the propagation medium is constantly changing (e.g., objects that create multi-path errors can move, weather can change, noise levels can change, etc.), the transfer function of any given propagation medium is also constantly changing. When the propagation medium is changing quickly, r(t) becomes a "fast fading" transmission channel, which can increase the complexity of the estimation process. "Long channels" occur when the propagation medium has a long delay spread. For example, if the distance that the signal 18 travels to reach the receiver 4 is sufficiently long compared to the signal 16, a symbol in the signal 18 may arrive at the receiver 4 after the same symbol arrives via the signal 16, thus creating ISI.

SUMMARY

A receiver for receiving an orthogonal frequency division multiplexed (OFDM) digital video broadcast (DVB) signal including OFDM symbol sets including data symbols and pilot symbols transmitted using several sub-carriers, the OFDM DVB signal being transmitted toward the receiver via a transmission channel, the receiver including an input module configured to receive the OFDM DVB signal via the transmission channel, and a channel estimation module coupled to the input module and configured to calculate channel estimates of the transmission channel by performing Fourier transforms on the OFDM symbol sets to produce transformed symbol sets in the frequency domain and by performing minimum mean square error (MMSE) equalization on the transformed symbol sets using a sub-set of the pilot symbols in the OFDM DVB signal.

Implementations of the invention may include one or more of the following features. The channel estimation module performs a single Fourier transform per received OFDM symbol set. The sub-set of pilot symbols is substantially less than all of the pilot symbols in the OFDM symbol set. The channel estimation module is configured to select, as the sub-set of pilot symbols, N closest pilot symbols transmitted using sub-carriers having frequencies lower than a frequency used to transmit a data symbol under inspection and N closest pilot symbols transmitted using sub-carriers having frequencies higher than the frequency used to transmit the data symbol under inspection. The channel estimation module is configured to select, as the sub-set of pilot symbols, N closest pilot symbols transmitted using sub-carriers having frequencies higher than a frequency used to transmit a data symbol under inspection. The channel estimation module is configured to select, as the sub-set of pilot symbols, N closest pilot symbols transmitted using sub-carriers having frequencies lower than a frequency used to transmit a data symbol under inspection. The channel estimation module calculates a channel estimate corresponding to each respective sub-carrier used to transmit each of the OFDM symbol sets.

Also, implementations of the invention may include one more of the following features. The channel estimation module is configured to calculate channel estimates of more than one of the data symbols in parallel. The constant N is equal to two and the channel estimation module is configured to perform the channel estimation of each of the data symbols according to:

$$\hat{H}(m) = \sum_{p=1}^{4} c_p \hat{H}(m_p)$$

where $c_p$ is a respective filter coefficient, $\hat{H}(m_p)$ is a channel estimate for a respective one of the sub-set of the pilot symbols, and p is an index value of a respective one of the sub-set of the pilot symbols. The channel estimation module is configured to calculate filter coefficients according to:

$$\underline{c(m)} = [c_1(m)c_2(m)c_3(m)c_4(m)]$$
$$= [R((m-m_1)_M)R((m-m_2)_M)R((m-m_3)_M)$$
$$R((m-m_4)_M)]R^{-1}$$

where $$R = \begin{bmatrix} R(0) & R(M-12) & R(M-24) & R(M-36) \\ R(12) & R(0) & R(M-12) & R(M-24) \\ R(24) & R(12) & R(0) & R(M-12) \\ R(36) & R(24) & R(12) & R(0) \end{bmatrix} + \sigma^2 I,$$

and $$R(m) = \sum_{l=0}^{L-1} \sigma_l^2 e^{-j2\pi \frac{ml}{M}}, 0 \le m \le M-1$$

where M is a total number of sub-carriers present in the OFDM DVB signal, l is an index representing each respective path of a multi-path OFDM DVB signal, L is a number representing the delay spread of the channel 115, m is an integer value representing a quantity of intervening channels between two selected channels of which correlation is being calculated, and $$E\{|h_l(k)|^2\} = \sigma_l^2$$

where $h_l(k)$ is the channel impulse response at time k of the $l^{th}$ path of the transmission channel.

Also, implementations of the invention may include one or more of the following features. The channel estimation module is configured to calculate an interchannel interference (ICI) value, in the frequency domain, related to the transmission channel. The channel estimation module is configured to perform the channel estimation using the ICI value. The channel estimation module is configured to perform MMSE equalization after subtracting the ICI value from the received OFDM DVB signal. The channel estimation module is configured to calculate channel estimates by estimating a channel correlation value according to:

$$\tilde{R}(m) = \frac{1}{K} \sum_{(k_2-k_1)_M = m} \hat{H}^*(k_1)\hat{H}(k_2),$$

where K is the number of cases that satisfy $(k_2-k_1)_M = m$ and M is a total number of sub-carriers present in the OFDM DVB signal. The estimated channel correlation value is averaged according to:

$$\hat{R}(m) = (1-\beta)\hat{R}(m) + \beta\tilde{R}(m),$$

where $\beta$ is a predetermined known parameter. The channel estimation module is configured to use a Viterbi decoder.

In general, in another aspect, the invention the invention provides a method for computing channel estimates of a transmission channel used to transmit an orthogonal frequency division multiplexed (OFDM) digital video broadcast (DVB) signal including OFDM symbol sets including data symbols and pilot symbols transmitted using several sub-carriers, the method including receiving the OFDM DVB signal at a receiver via a transmission channel, calculating channel estimates of the transmission channel in the frequency domain by performing Fourier transforms on OFDM symbol sets to produce transformed symbols sets in the frequency domain and by performing minimum mean square error (MMSE) equalization on the transformed symbol sets using a sub-set of the pilot symbols in the OFDM DVB signal.

Implementations of the invention may include one or more of the following features. Calculating channel estimates includes calculating channel estimates by performing a single Fourier transform per received OFDM symbol set. The method further includes selecting, as the sub-set of pilot symbols, N closest pilot symbols transmitted using sub-carriers having frequencies lower than a frequency used to transmit a data symbol under inspection and N closest pilot symbols transmitted using sub-carriers having frequencies higher than the frequency used to transmit the data symbol under inspection. The method further includes selecting, as the sub-set of pilot symbols, N closest pilot symbols transmitted using sub-carriers having frequencies lower than a frequency used to transmit a data symbol under inspection. The method further includes selecting, as the sub-set of pilot symbols, N closest pilot symbols transmitted using sub-carriers having frequencies higher than a frequency used to transmit a data symbol under inspection. Calculating channel estimates includes calculating channel estimates of more than one of the data symbols in parallel.

Also, implementations of the invention may include one or more of the following features. Calculating the channel estimates includes calculating the channel estimate of a data symbol of interest with N being equal to two and according to:

$$\hat{H}(m) = \sum_{p=1}^{4} c_p \hat{H}(m_p)$$

where $c_p$ is a respective filter coefficient, $\hat{H}(m_p)$ is a channel estimate for a respective one of the sub-set of the pilot symbols, and p is an index value of a respective one of the sub-set of the pilot symbols. Calculating the channel estimates includes calculating filter coefficients according to:

$$\underline{c(m)} = [c_1(m)c_2(m)c_3(m)c_4(m)]$$
$$= [R((m-m_1)_M)R((m-m_2)_M)R((m-m_3)_M)$$
$$R((m-m_4)_M)]R^{-1}$$

where $$R = \begin{bmatrix} R(0) & R(M-12) & R(M-24) & R(M-36) \\ R(12) & R(0) & R(M-12) & R(M-24) \\ R(24) & R(12) & R(0) & R(M-12) \\ R(36) & R(24) & R(12) & R(0) \end{bmatrix} + \sigma^2 I,$$

and $$R(m) = \sum_{l=0}^{L-1} \sigma_l^2 e^{-j2\pi \frac{ml}{M}}, 0 \le m \le M-1$$

where M is a total number of sub-carriers present in the OFDM DVB signal, l is an index representing each respective path of a multi-path OFDM DVB signal, L is a number representing the delay spread of the channel 115, m is an integer value representing a quantity of intervening channels between two selected channels of which correlation is being calculated, and $$E\{|h_l(k)|^2\}=\sigma_l^2$$

where $h_l(k)$ is the channel impulse response at time k of the $l^{th}$ path of the transmission channel.

Also, implementations of the invention may include one or more of the following features. Calculating channel estimates includes calculating a channel estimate corresponding to each respective sub-carrier used to transmit the OFDM DVB signal. The method further includes calculating an interchannel interference (ICI) value, in the frequency domain, related to the transmission channel. Calculating the channel estimates includes calculating channel estimates of the transmission channel using the ICI value. Calculating the channel estimates includes performing MMSE equalization after subtracting the ICI value from the OFDM DVB signal. Calculating channel estimates further includes calculating channel estimates by estimating a channel correlation value according to:

$$\tilde{R}(m) = \frac{1}{K} \sum_{(k_2-k_1)_M=m} \hat{H}^*(k_1)\hat{H}(k_2),$$

where K is the number of cases that satisfy $(k_2-k_1)_M=m$ and M is a total number of sub-carriers present in the OFDM DVB signal. Calculating channel estimates further includes averaging the estimated channel correlation value according to:

$$\hat{R}(m)=(1-\beta)\hat{R}(m)+\beta\tilde{R}(m),$$

where β is a predetermined known parameter. Calculating channel estimates further includes performing Viterbi decoding.

Various aspects of the invention may provide one or more of the following capabilities. Computations performed by a DTV channel estimation module can be reduced compared to prior techniques. Implementation cost for a DTV channel estimation module can be reduced compared to prior techniques. Channel estimation can be performed using a single Fourier Transform for each symbol received via each channel of an OFDM DTV signal. One-dimensional channel estimation can be performed in the frequency domain. Minimum Mean Square Error estimation can be performed using a sub-set of pilot symbols provided via an OFDM DTV signal. A subset of pilot symbols (e.g., four) can be used to calculate a channel estimate of a selected channel. Using the union of every third symbol, (starting at the second lowest-frequency sub-carrier) and pilot symbols can, result in similar performance as using all sub-carriers in an 8K DVB-T/H system. These and other capabilities of the invention, along with the invention itself, will be more fully understood after a review of the following figures, detailed description, and claims.

DETAILED DESCRIPTION

Embodiments of the invention provide techniques for transmission channel estimation and equalization of digital video broadcast (DVB) transmissions by combining, in the frequency domain, minimum mean square error (MMSE) equalization using a sub-set of the total available pilot symbols and interchannel interference (ICI) estimation. For example, a DTV system includes a transmitter and a receiver. The transmitter produces an OFDM signal that includes pilot symbols. The transmitter broadcasts the OFDM signal towards the receiver. The receiver calculates channel estimates using frequency-domain MMSE equalization. The MMSE equalization is carried out using channel correlation information and a sub-set of the pilots contained in the OFDM signal. The channel estimates are used by the receiver to estimate the signal transmitted by the transmitter. The receiver outputs the resulting signal that is substantially similar to the signal transmitted towards the receiver by the transmitter. Other embodiments are within the scope of the invention.

Figure 2:
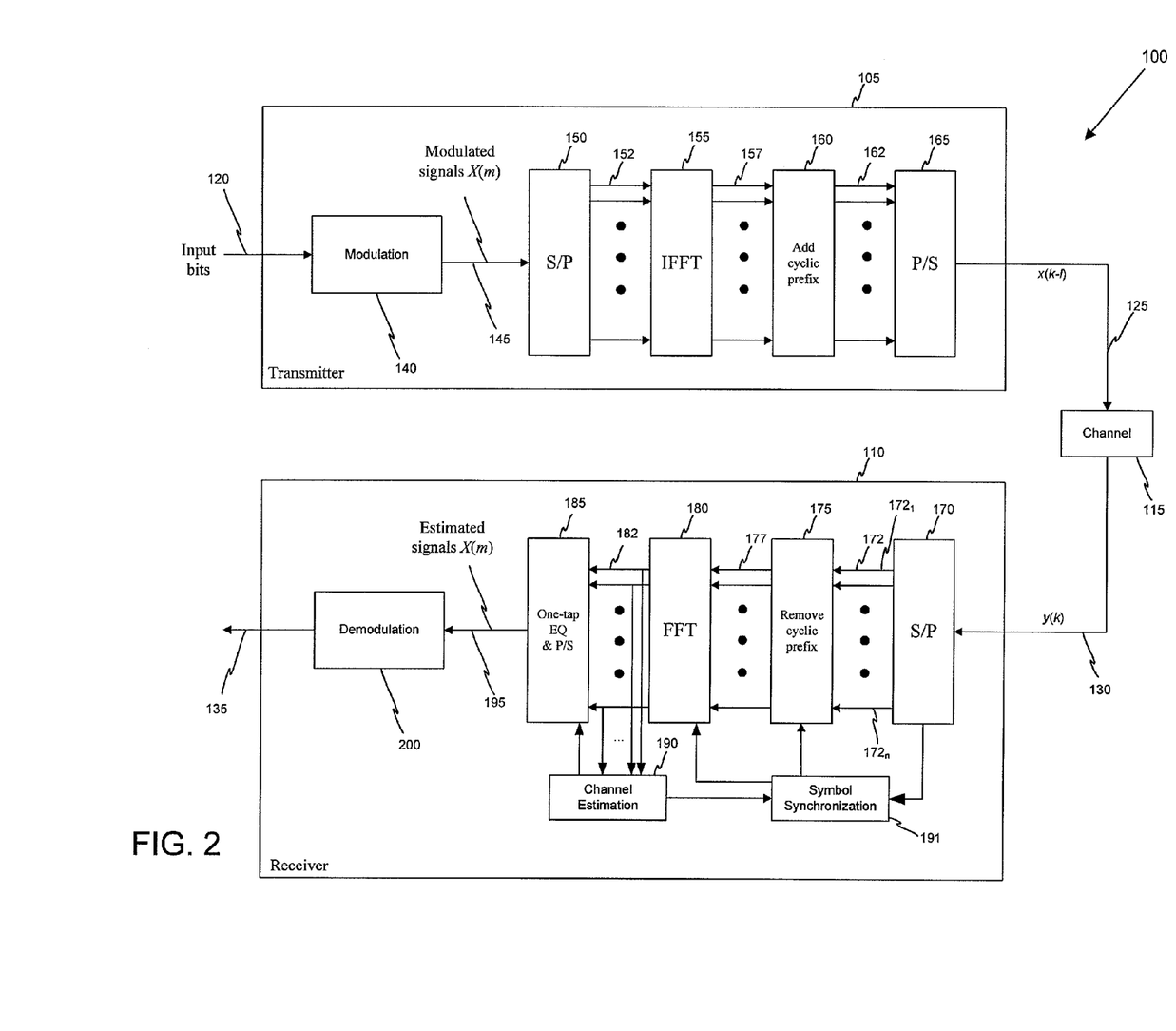
FIG. 2 is a block diagram of a baseband OFDM system including a transmitter and a receiver.

Referring to FIG. 2, an OFDM transmission system 100 includes a transmitter 105 and a receiver 110. The system 100 includes appropriate hardware, firmware, and/or software (including computer-readable, preferably computer-executable instructions) to implement the functions described below. The transmitter 105 and the receiver 110 can be configured to communicate various types of information. Here, as an example only and not as a limitation, the transmitter 105 is a transmitter for DTV signals and the receiver 110 is a DTV receiver such as a digital television or a set-top box and digital television combination. For example, the system 100 is configured to transmit and receive terrestrial DTV signals in accordance with the DVB-T/H standard via antennas (not shown in FIG. 2). The transmitter 105 and the receiver 110 are linked by a transmission channel 115. The transmission channel 115 is a propagation medium such as the atmosphere (in the case of a terrestrial broadcast), although other propagation mediums are possible (e.g., a cable with appropriate transmitters and receivers being used). The transmitter 105 is configured to receive an input signal 120 and to broadcast an OFDM signal 125 towards the receiver 110. The transmission channel 115 can affect the signal 125 and transform it into a signal 130. The receiver 110 is configured to receive the signal 130 and to output an output signal 135, which is preferably substantially equal to the signal 125.

The relation of the signals 125 and 130 can be defined in the time-domain as:

$$y(k) = \sum_{l=0}^{L-1} h_l(k)x(k-l) + n(k), 0 \le k \le M-1, \quad (1)$$

where y(k) is the signal 130, l is an index of a channel path (of the transmission channel 115) that represents channel taps in the time domain, x(k-l) is the signal 125, $h_l(k)$ is the channel impulse response (CIR) at time k of the $l^{th}$ path of the transmission channel 115, n(k) (0≤k≤M−1) are independent complex-valued random Gaussian variables (e.g., additive white Gaussian noise (AWGN)) in the time domain having a zero mean and a variance of $\sigma^2$ for both real and imaginary components, L is a number representing the delay spread of the channel 115, and M is a quantity of sub-carriers used by the transmitter 105. The CIR $h_l(k)$, ($0 \leq l \leq L-1$) can be independent complex-valued random variables for different paths that have a Gaussian distribution, which can represent a channel having frequency selective Rayleigh fading where $$E\{|h_l(k)|^2\} = \sigma_l^2. \quad (2)$$

Variation of the transmission channel 115 over time can be characterized by a value $f_d T_s$, where $f_d$ is the Doppler Frequency and $T_s$ is the OFDM symbol set duration. Furthermore, a power spectrum of a Rayleigh fading process (e.g., time-spreading of a signal (or signal dispersion) and/or time-variant behavior of the transmission channel 115) can be defined as:

$$S_l(f) = \begin{cases} \dfrac{\sigma_l^2}{\pi \sqrt{f_d^2 - f^2}}, & |f| < f_d^2 \\ 0, & \text{otherwise} \end{cases} \quad (3)$$

where the correlation of a CIR tap (e.g., the CIR for a single path of a multi-path signal) in the time domain can be characterized as:

$$E\{h_l(k_1) h_l^*(k_2)\} = \sigma_l^2 J_0(2\pi f_d |k_1 - k_2| T_s/M), \quad (4)$$

where $J_0(\cdot)$ is the $0^{th}$ order Bessel function of the first kind:

$$J_0(x) = \sum_{k=0}^{\infty} \frac{(-1)^k}{2^{2k}(k!)^2} x^{2k}. \quad (5)$$

The transmitter 105 includes a modulation unit 140, a serial-to-parallel (S/P) converter 150, processors 155 and 160, and a parallel-to-serial (P/S) converter 165. The modulation unit 140 is configured to receive a frequency-domain signal 120 that includes information (e.g., information representative of a video image) and to modulate the signal 120 using one (or more) of several modulation schemes. For example, the modulation unit 140 can map the signal 120 to a constellation using a modulation scheme such as quadrature phase shift keying (QPSK), or quadrature amplitude modulation (QAM) (e.g., 16 QAM or 64 QAM), although other modulation schemes are possible. The modulation scheme can be different for each sub-carrier (e.g., one sub-carrier can be modulated using 16 QAM, and another using QPSK), or all sub-carriers can use the same modulation scheme. The modulation unit 140 is configured to output a modulated signal 145 that can include complex data variables (e.g., $X(0), \ldots, X(M-1)$, where M is the number of sub-carriers (e.g., the number of samples in one OFDM symbol)). The modulation unit 140 is configured to provide the modulated signal 145 to the S/P converter 150. The S/P converter 150 is configured to convert the signal 145 into a parallel information signal 152 that can be provided to the processor 155 over parallel streams. The number of parallel streams can depend on the type of DVB system being implemented (e.g., a 2K, 4K, or 8K system). The processor 155 is configured to perform an Inverse Fast Fourier Transform (IFFT) on the signal 152 to convert the signal 145 into a time-domain signal 157 that includes output symbols $x(0), \ldots, x(M-1)$. The processor 160 is configured to add a cyclic prefix to the beginning of each output symbol produced by the processor 155 and to produce a signal 162. The cyclic prefix of a frame x can replicate a portion of a frame x−1, and can be used to reduce the effects of intersymbol interference (ISI). The P/S converter 165 is configured to convert the signal 162 into the serial transmitted signal 125. The transmitter 105 is configured to broadcast the signal 125 via an antenna (not shown in FIG. 2). While the transmitter 105 has been described as including multiple processors and hardware pieces, the functionality provided by the transmitter 105 can be combined into, for example, a single chip having multiple software modules that perform the respective tasks.

Figure 3:
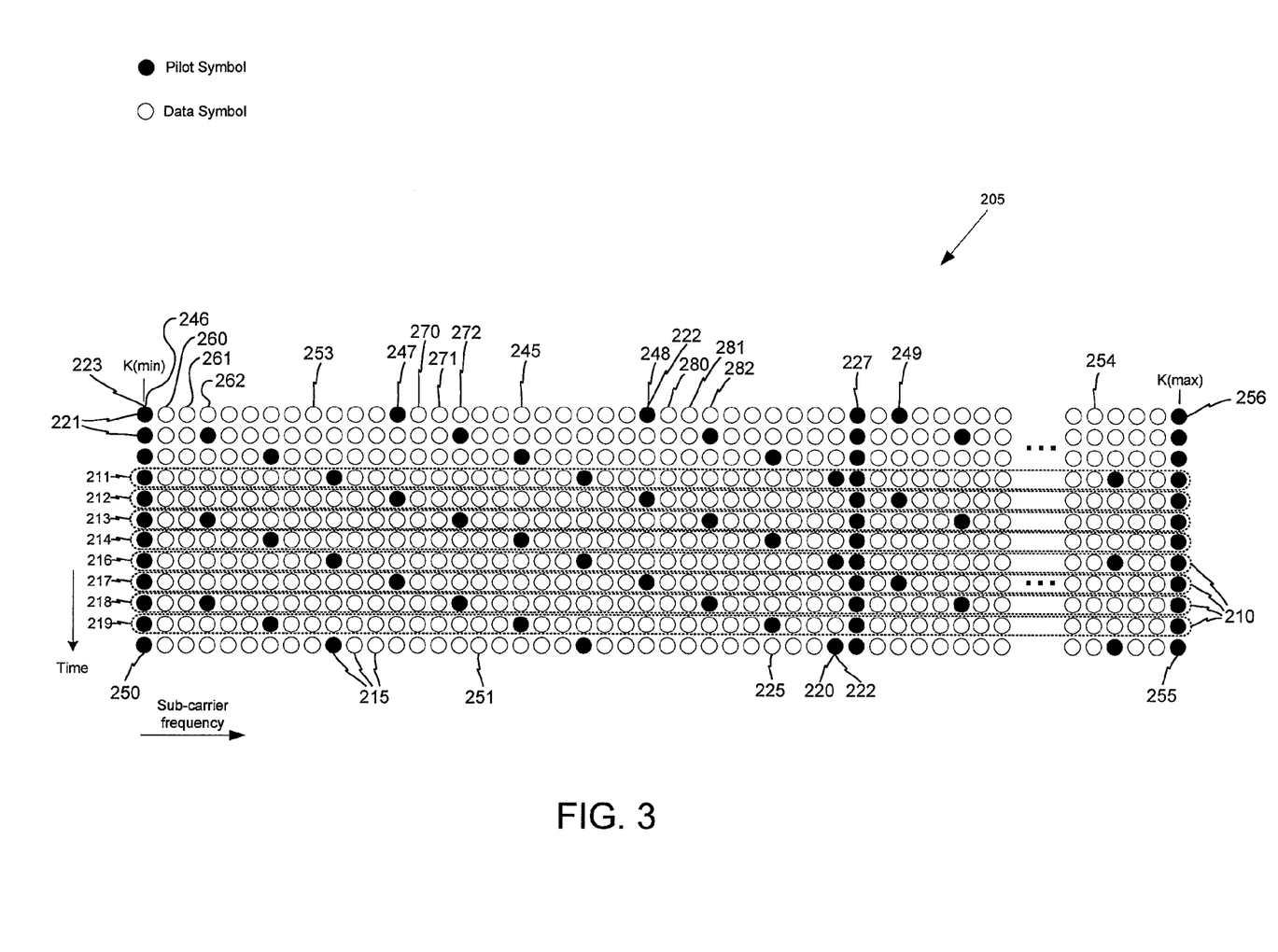
FIG. 3 is a diagram of an OFDM frame transmitted by the transmitter shown in FIG. 2.

Referring also to FIG. 3, the signal 125 includes an OFDM frame 205 including OFDM symbol sets 210. Each of the OFDM symbol sets 210 include multiple symbols 215 modulated by distinct sub-carrier frequencies. Each OFDM symbol set 210 includes pilot symbols 220, data symbols 225, and TPS symbols 227, although other configurations are possible. The pilot symbols 220 include continuous pilot symbols 221 that are modulated by the same sub-carrier frequency in each of the OFDM symbol sets 210, and scattered pilot symbols 222 that are disposed at different sub-carrier positions in different symbol sets 210. The spacing between each of the scattered pilot symbols 222 is twelve symbol positions such that every twelfth symbol position in a symbol set is occupied by a scattered pilot symbol. Occurrences of the continuous pilot symbols 221 and the scattered pilot symbols 222 can coincide (e.g., a pilot symbol 223). While the OFDM frame 205 is shown in FIG. 3 as including twelve of the OFDM symbol sets 210, other quantities of symbols sets 210 are possible. Furthermore, the placement of the pilot symbols 220, data symbols 225, and TPS symbols 227 can vary from the arrangement shown in FIG. 3.

The receiver 110 includes an S/P converter 170, processors 175, 180, 185, 190, and 191, and a demodulation unit 200. The receiver 110 is configured to receive the signal 130 and output the signal 135. The signal 130 includes time-domain information (e.g., symbols $y(0), \ldots, y(M-1)$, where M is the number of sub-carriers used to transmit the signal 130). The S/P converter 170 is configured to receive the signal 130 and convert it into a parallel signal 172. The S/P converter 170 is configured such that each of the parallel paths $172_1$ through $172_n$ of the signal 172 include symbols transmitted using different sub-carrier frequencies. The number of parallel streams in the signal 172 is equal to a quantity of the symbols 215 in each of the OFDM symbol sets 210, although other configurations are possible. The S/P converter 170 is configured to provide the signal 172 to the processor 175. The processor 175 is configured to receive the signal 172 and to remove the cyclic prefix added by the processor 160. The processor 175 is configured to provide a parallel time-domain signal 177 to the processor 180. The processor 180 is configured to perform a Fast Fourier Transform (FFT) to convert the time-domain signal 177 into a frequency-domain signal 182. The processor 191 is configured to provide symbol synchronization which can obtain the starting symbol of an OFDM time domain OFDM symbol set for use in a Fourier Transform.

The FFT operation carried out by the processor 180 can be defined as:

$$Y(m) = \sum_{l=0}^{L-1} \sum_{n=0}^{M-1} X(n) H_l(m-n) e^{-j2\pi \frac{nl}{M}} + N(m), \quad 0 \leq m \leq M-1, \quad (6)$$

where Y(m) is the signal 182, X(n) is the signal 152, N(m) is AWGN described in the frequency domain, and H$_l$(m-n) is provided by:

$$H_l(m-n) = \frac{1}{M}\sum_{k=0}^{M-1} h_l(k)e^{-j2\pi\frac{k(m-n)}{M}}. \quad (7)$$

Equation (6) can be rewritten in vector form as:

$$\underline{Y} = H\underline{X} + \underline{N} \quad (8)$$

where the element in the m$^{th}$ row and n$^{th}$ column of the channel matrix H is:

$$H_{m,n} = \sum_{l=0}^{L-1} H_l(m-n)e^{-j2\pi\frac{nl}{M}}. \quad (9)$$

The processors 185 and 190 are each configured to receive the signal 182 provided by the processor 180. The processor 185 is configured to use information provided by the processor 190 (e.g., final channel estimates, as described below) to estimate the location of samples in a constellation of the chosen modulation method. For example, each of the parallel information streams in the signal 182 contains modulation symbols (e.g., 16 QAM, 64 QAM, and/or QPSK) and the processor 185 can map the modulation symbols to corresponding constellation points using final channel estimates provided by the processor 190. While the receiver 110 has been described as including multiple processors and other hardware pieces, the functionality provided by the receiver 110 can be combined into, for example, a single chip having multiple software modules that provide the respective functionality.

For each OFDM symbol set 210 the receiver 110 receives from the transmitter 105, via the signal 130, the processor 190 is configured to:

Pre-calculate (or retrieve from a memory) the IFFT of (k−M−1/2);
Calculate MMSE filtering coefficients using initial channel correlation estimation, interpolation, and a sub-set of the pilot symbols present in the signal 182.
Carry out MMSE channel estimation using the calculated MMSE filtering coefficients;
Estimate the signal 125 using the result of the MMSE channel estimation and a one-tap equalizer (contained in the processor 190);
Calculate the frequency domain variation of the transmission channel 115;
Perform an ICI cancellation scheme to re-estimate the transmitted signal 125;
Carry out MMSE equalization on a version of the signal 130 from which the estimated ICI has been subtracted using the previously calculated MMSE coefficients;
Obtain an estimate of the transfer function of the transmission channel 115 using the final estimates of the signal 125 and the signal 130;
Estimate and update the channel correlation in the frequency domain;
Update the MMSE filtering coefficients; and
Provide a final channel estimate (e.g., a transfer function) to the processor 185.

Referring to FIGS. 2 and 3, the processor 190 is configured to use the a priori known pilot symbols as known anchor points for estimating characteristics of the transmission channel 115. The receiver 110 is configured to expect the pilot symbols at certain frequencies and/or times in each of the OFDM frames 205. The processor 190 is configured to search the signal 130 for the pilot symbols, which have been affected by the transmission channel 115 (e.g., according to the transfer function shown in Equation (1)). The processor 190 is configured to compute channel estimates of the transmission channel 115 using a sub-set (e.g., four) of the received scattered pilot symbols 222 in each of the OFDM symbol sets 210, preferably that surround and are closest to the symbol 215 to be estimated. For example, to perform channel estimation on a symbol 245, pilot symbols 246, 247, 248, and 249 can be used. Channel estimates for symbols 215 occurring near the lowest and highest frequency sub-carriers (e.g., a symbol 250 and a symbol 255, respectively), can be calculated using fewer than four pilot symbols. For example, to calculate a channel estimate for a symbol 253, pilot symbols 246 and 247 can be used, or pilot symbols 246, 247, 248, and 249. While the sub-set of pilot symbols has been described as two and/or four of the scattered pilot symbols 222, other quantities are possible. Using the sub-set of the scattered pilot symbols 222, MMSE equalization can be applied in the frequency domain to provide a channel estimation algorithm that can be used with fast-changing transmission channels, and/or long transmission channels.

Figure 4:
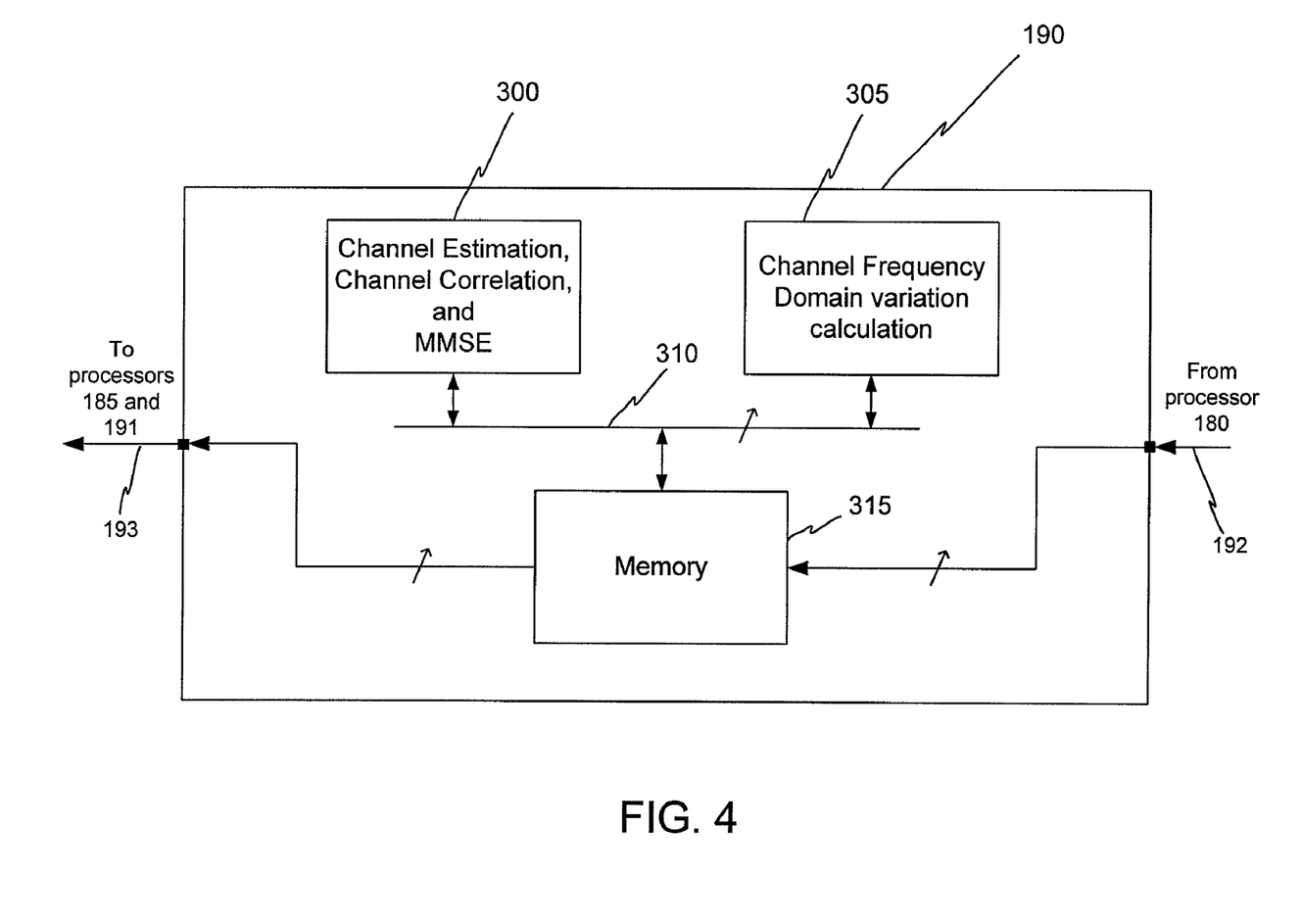
FIG. 4 is a block diagram of functional elements of the receiver shown in FIG. 2.

Referring also to FIG. 4, the processor 190 includes modules 300 and 305, a bus 310, and a memory 315. The modules 300 and 305 can be, for example, software functions operating on a processor, although other configurations are possible (e.g., separate hardware pieces). The processor 190 is configured to receive copies of each of the symbols 215 in each of the OFDM symbol sets 210 received by the receiver 110 and to output final channel estimates to the processor 185. The memory 315 is configured to store copies of the symbols 215 received from the processor 180. While the processor 190 as shown includes the bus 310, other topologies are possible (e.g., point to point connections). The processor 191 is configured to calculate the desired Fourier transform window based on the output of the S/P converter 170. For example, the processor 191 is configured to use the property that the cyclic prefix of an OFDM symbol set is a repeat of the tail end of the prior OFDM symbol set.

The module 300 is configured to perform initial channel correlation using the pilot symbols 222 and interpolation. Correlation is the measure of how well a transfer function of a first sub-carrier can be predicted based on a measurement of a transfer function of a second sub-carrier. A higher correlation value between two sub-carriers indicates that there is a higher probability of predicting the behavior (e.g., the transfer function) of the first sub-carrier based on observations of the second sub-carrier. Thus, larger values of correlation can indicate that the sub-carrier frequencies have very similar transfer functions to one another, thus permitting a higher level of predictability between two sub-carriers. A smaller correlation value can indicate that the channels are independent, thus lowering the level of predictability between two sub-carriers. The module 300 is configured to calculate initial correlation between two sub-carriers, using an assumed correlation, according to:

$$R(m) = \sum_{l=0}^{L-1}\sigma_l^2 e^{-j2\pi\frac{ml}{M}}, 0 \le m \le M-1, \quad (10)$$

where M is the total number of sub-carriers, L is a number representing the delay spread of the channel 115, and l is an index of a channel path (of the transmission channel 115) that represents channel taps in the time domain. Equation (10) is preferably used when no prior OFDM symbol sets 210 have been received by the receiver 110 (e.g., at startup), although Equation (10) can be used when previous OFDM symbol sets 210 have been received.

For each symbol 215 in each of the OFDM symbol sets 210, the module 300 is configured to determine the location of the four nearest pilots 222. To select the four pilots nearest to a sub-carrier of interest, the module 300 is configured to select the two closest scattered pilot symbols 222 having sub-carrier indexes higher than the sub-carrier of interest, and the two closest scattered pilot symbols 222 having sub-carrier indexes lower than the sub-carrier of interest. For example, to calculate a channel estimate for the symbol 245, the module 300 is configured to select the pilot symbols 246 and 247 (the two closest pilot symbols 222 having indexes lower than the sub-carrier of interest) and to select the pilot symbols 248 and 249 (the two closest pilots 222 having indexes greater than the sub-carrier of interest).

For "edge" sub-carriers (e.g., the sub-carriers used to transmit the symbols 215 between the pilot 246 and the pilot 247), the module 300 is configured to use less than four pilots in the estimation process. For example, there is only one pilot symbol 222 transmitted using a lower-frequency sub-carrier than symbol 253, (e.g., the pilot symbol 246). Likewise, there is only one pilot symbol 222 transmitted using a higher-frequency sub-carrier than symbol 254, i.e., a pilot symbol 256 (assuming that the pilot symbol 256 is considered a "scattered" pilot symbol). The pilots used by the module 300 to calculate channel estimates for edge sub-carriers can be symmetrical or asymmetrical. For example, to calculate a channel estimate for the symbol 253, the pilot symbols 246 and 247; the pilot symbols 246 and 248; the pilot symbols 247 and 248; or the pilot symbols 248 and 249 can be used. Alternatively, the module 300 can be configured to locate four (or more) pilots to be used to estimate edge sub-carriers. For example, the module 300 can be configured to select the pilot symbols 246, 247, 248, and 249 to calculate a channel estimate for the symbol 253. Using two fewer than four pilot symbols to estimate edge sub-carriers can reduce the number of calculations used in the estimation process.

The module 300 is configured to calculate at least twelve sets of MMSE filtering coefficients for each of the OFDM symbol sets 210 received by the receiver 110. Each set of the MMSE filtering coefficients corresponds to one of the symbols 215 between the pilot symbols 247 and 248 and one coefficient set corresponds to the pilot symbol 248. Furthermore, each set of MMSE filtering coefficients corresponds to a respective symbol position (relative to surrounding scattered pilot symbols 222). For example, a first MMSE coefficient set corresponds to data symbols 225 having an index one higher than those of the scattered pilot symbols 222 (e.g., a first MMSE coefficient set corresponds to symbols 260, 270, 280, . . . ), a second MMSE coefficient set corresponds to data symbols 225 having an index two higher than those of the scattered pilot symbols 222 (e.g., a second set of MMSE filtering coefficients corresponds to symbols 261, 271, 281, . . . ), a third MMSE coefficient set corresponds to data symbols 225 having an index three higher than those of the scattered pilot symbols 222 (e.g., a third MMSE coefficient set corresponds to symbols 262, 272, 282, . . . ), etc. One of the MMSE coefficient sets (e.g., a twelfth set) corresponds to the scattered pilot symbols 222. The module 300 is configured to calculate the twelve sets of MMSE filtering coefficients according to:

$$\underline{c(m)} = [c_1(m) c_2(m) c_3(m) c_4(m)] = \\ [R((m-m_1)_M) R((m-m_2)_M) R((m-m_3)_M) R((m-m_4)_M)] R^{-1}, \quad (11)$$

where $(\cdot)_M$ is the modular operation and $$R = \begin{bmatrix} R(0) & R(-12) & R(-24) & R(-36) \\ R(12) & R(0) & R(-12) & R(-24) \\ R(24) & R(12) & R(0) & R(M-12) \\ R(36) & R(24) & R(12) & R(0) \end{bmatrix} + \sigma^2 I, \quad (12)$$

where R is preferably computed each time one of the OFDM symbol sets 210 is received by the receiver 110. R, however, can be computed more than once per received OFDM symbol set 210.

The module 300 is configured to compute additional MMSE filtering coefficients corresponding to sub-carriers near the highest and lowest sub-carrier frequency used to transmit the signal 125. The quantity of additional MMSE coefficients calculated by the module 300 depends on the pattern of the pilot symbols 220. The OFDM symbol sets 210 shown in FIG. 3 have four different configurations of the scattered pilot symbols 222. For example, the configuration of the scattered pilot symbols 222 is identical in OFDM frames 211 and 216, OFDM frames 212 and 217, OFDM frames 213 and 218, and OFDM frames 214 and 219. The quantity of additional MMSE coefficient sets calculated by the processor 190 can depend on the quantity of data symbols 225 between the lowest-frequency sub-carrier and the lowest-frequency scattered pilot symbol 222 (or second-lowest frequency scattered pilot symbol 222 when the lowest-frequency continuous pilot symbol 221 coincides with the lowest-frequency scattered pilot symbol 222). For example, if the lowest-frequency pilot symbol 222 was transmitted using the fourth lowest sub-carrier, then four additional MMSE coefficient sets are calculated. If the lowest-frequency pilot symbol 222 was transmitted using the seventh lowest sub-carrier, then seven additional MMSE coefficient sets are calculated. Likewise, the quantity of additional MMSE coefficient sets calculated by the processor depends on the quantity of data symbols 225 between the highest-frequency sub-carrier and the highest-frequency scattered pilot symbol 222 (or the second-highest frequency scattered pilot symbol 222 when the highest-frequency continuous pilot symbol 221 coincides with the highest-frequency scattered pilot symbol 222). Equation 12 can vary depending on the pattern of the pilot symbols 220. For example, if two of the pilot symbols 220 are used to calculate cannel estimates for edge-sub carriers, then Equation 12 can be rewritten as:

$$R = \begin{bmatrix} R(0) & R(-S) \\ R(S) & R(0) \end{bmatrix} + \sigma^2 I, \quad (12a)$$

where S is the spacing of the pilot symbols 220 used to calculate a channel estimate. For example, for OFDM frame 213, Equation 12 can be rewritten as:

$$R = \begin{bmatrix} R(0) & R(-3) \\ R(3) & R(0) \end{bmatrix} + \sigma^2 I, \quad (12b)$$

for OFDM frame 214, Equation 12 can be rewritten as:

$$R = \begin{bmatrix} R(0) & R(-6) \\ R(6) & R(0) \end{bmatrix} + \sigma^2 I, \quad (12c)$$

for OFDM frame 216, Equation 12 can be rewritten as:

$$R = \begin{bmatrix} R(0) & R(-9) \\ R(9) & R(0) \end{bmatrix} + \sigma^2 I, \quad (12d)$$

for OFDM frame 217, Equation 12 can be rewritten as:

$$R = \begin{bmatrix} R(0) & R(-12) \\ R(12) & R(0) \end{bmatrix} + \sigma^2 I. \quad (12e)$$

While the module 300 has been described as calculating four, seven, ten, or thirteen additional MMSE coefficients, other quantities of coefficients can be calculated.

Using the above filtering coefficients, the module 300 is configured to calculate a channel estimate of a sub-carrier of interest according to:

$$\hat{H}(m) = \sum_{p=1}^{4} c_p \hat{H}(m_p), \quad (13)$$

where $\hat{H}(m_p)$ are the channel estimates of the sub-carriers used to transmit the selected sub-set of pilot symbols 220 (selected as described above):

$$\hat{H}(m_p) = \frac{Y(m_p)}{X(m_p)}, \quad (13a)$$

and $c_p(m)$ are corresponding MMSE filtering coefficients.

The module 300 is configured to estimate the signal transmitted by the transmitter 105 (e.g., the signal 125) using the initial channel estimates obtained using Equation (13). The module 300 is configured to estimate the signal transmitted by the transmitter 105 using the channel estimates of all of the sub-carriers used to transmit the signal 125. The module 300 is configured to calculate an estimate of the signal 125 using one-tap equalization according to:

$$\hat{X}(m) = \frac{Y(m)}{\hat{H}(m)}, \quad 0 \le m \le M-1, \quad (14)$$

where $\hat{X}(m)$ is an estimated version of the transmitted signal (here, the signal 125), Y(m) is the Fourier Transform of the signal 130, and $\hat{H}(m)$ are the channel estimates obtained using Equation (13).

The module 300 is configured to substitute the received pilot symbols with the actual transmitted pilot symbols 220 and to replace the received TPS symbols 227 with estimated TPS symbols. Replacing the received pilot symbols 220 with the actual pilot symbols, and replacing the received TPS symbols 227 with the estimated TPS symbols, can increase the accuracy of the channel estimates calculated by the processor 190. For example, the scattered pilot symbol 247 is affected by the transmission channel 115 (as described above). The receiver 110, however, knows a priori the value of the pilot symbol 247. Thus, the module 300 can substitute the actual version of the pilot symbol 247 for the received version of the pilot symbol 247. The module 300 is further configured to replace the received TPS symbols 227 with estimated TPS symbols to establish additional known reference points. To replace the received TPS symbols 227 with the estimated TPS symbols, the module 300 is configured to estimate the TPS symbols 227 by taking the average of all of the TPS symbols in a single OFDM symbol set 210 according to:

$$\hat{X}_{TPS} = \begin{cases} 1, & \sum_{p \in P_{TPS}} X(m_p) \ge 0 \\ -1, & \sum_{p \in P_{TPS}} X(m_p) < 0 \end{cases}. \quad (15)$$

Increasing the accuracy of the channel correlation calculation by using the substituted pilot symbols 220 and averaged TPS symbols 227 can increase the accuracy of the channel estimation process. Thus, the module 300 is configured to modify the initial channel correlation values calculated using Equation (10). The module 300 is configured modify the initial channel correlation by calculating another iteration of channel estimates according to:

$$\hat{H}(m) = \frac{Y(m)}{\hat{X}(m)}, \quad 0 \le m \le M-1, \quad (16)$$

where $\hat{X}(m)$ is now the estimated version of the signal 125 having the substituted pilot symbols and the substituted TPS symbols. The module 300 is configured to calculate an estimate of the channel correlation (thereby replacing the assumption made in Equation (10)) with:

$$\tilde{R}(m) = \frac{1}{K} \sum_{(k_2-k_1)_M = m} \hat{H}^*(k_1)\hat{H}(k_2), \quad (17)$$

where K is the number of cases that satisfy $(k_2-k_1)_M = m$. The channel correlation module 300 is configured to store $\tilde{R}(m)$ in the memory 315. The pilot symbols 220 and TPS symbols 227 are preferably used to calculate the channel correlation because the channel estimates obtained using these symbols are more reliable than using data symbols. Knowing the pilot symbols 220 a priori, the processor 190 can calculate a more accurate channel correlation. For example, the processor 190 can calculate a substantially accurate channel estimate (at the specific time and frequency of each of the respective pilot symbols 220) by comparing an actual transmitted pilot symbol to a received version of the transmitted pilot symbol. Using a substantially accurate channel estimate of the pilot symbols 220, the processor 190 can have a higher likelihood of calculating a more accurate channel correlation value. Other channels, (e.g., not a pilot or TPS symbol, can be chosen as reference points using, for example, signal-to-noise ratio as the selection criterion.

The channel correlation module 300 is configured to obtain the estimated averaged correlation of the channel 115 in the time domain according to:

$$\hat{R}(m) = (1-\beta)\hat{R}(m) + \beta\tilde{R}(m), \quad (18)$$

where β is a predetermined known parameter (e.g., 1/16, 1/8) used to replace a portion of the previous correlation estimate. Increasing the quantity of symbol sets 210 used to calculate the average channel correlation can result in a channel correlation that is smoother and/or closer to the actual channel correlation. The channel correlation module 300 is configured to store R̂(m) in the memory 305.

To perform channel estimation of fast-changing transmission channels, the receiver 110 should include ICI in the channel estimation calculations. Interchannel interference can occur when the transmission channel 115 is not constant within a single OFDM symbol set 210. The ICI can be accounted for in the MMSE calculations by rewriting Equation (6) as:

$$Y(m) = H(m)X(m) + ICI(m) + N(m), \quad 0 \le m \le M-1, \quad (19)$$

where, $$H(m) = \sum_{l=0}^{L-1} \left( \frac{1}{M} \sum_{k=0}^{M-1} h_l(k) \right) e^{-j2\pi \frac{ml}{M}}, \quad (20)$$

which is the FFT of the average CIR within a particular OFDM symbol, and $$ICI(m) = \sum_{l=0}^{L-1} \sum_{n=0, n \ne m}^{M-1} X(n) H_l(m-n) e^{-j2\pi \frac{nl}{M}}, \quad (21)$$

which is the interference caused by time variation in the transmission channel 115.

The module 305 is configured to account for fast-changing channels by taking into account ICI present in the signal 130. The module 305 is configured to estimate and subtract from the estimated signal (e.g., X̂(m)) the frequency-domain ICI present in the signal 130. The module 305 is configured to assume that the time-domain variation of the transmission channel 115, between two of the OFDM symbol sets 210, is linear, although other assumptions can be made. Using this assumption, the module 305 is configured to calculate the difference between channel estimates of an OFDM symbol set 210 currently being received and channel estimates of a previously received OFDM symbol set 210 according to:

$$\hat{H}_{slope} = \frac{\hat{H}^C - \hat{H}^P}{M+G}, \quad (22)$$

where $\hat{H}^C$ is the channel estimates of the current OFDM symbol set 210, $\hat{H}^P$ is the channel estimates of the previous OFDM symbol set 210 (e.g., retrieved from the memory 315), and G is the length of the guard interval, which is known a priori. $\hat{H}^C$ and $\hat{H}^P$ can be calculated as described herein.

To understand the relationship between the channel slope and the ICI terms, it is useful to reorganize Equation (6) as:

$$Y(m) = H(m)X(m) + \sum_{q=-Q, q \ne 0}^{Q} X(m+q) \left( \sum_{l=0}^{L-1} \frac{1}{M} \sum_{k=0}^{M-1} h_l(k) e^{j2\pi \frac{kq}{M}} e^{-j2\pi \frac{(m+q)l}{M}} \right) + \tilde{N}(m), \quad (23)$$

where $\tilde{N}(m)$ includes $N(m)$ and the remaining terms for $|q| > Q$, where q is an index of a sub-carrier. Using the Equation (23), the module 305 is configured to represent an impulse response of the transmission channel 115 according to:

$$h_l(k) = \bar{h}_l + \alpha_l \left( k - \frac{M-1}{2} \right), \quad (24)$$

where $$\bar{h}_l = \frac{1}{M} \sum_{k=0}^{M-1} h_l(k), \quad (25)$$

and $\alpha_l$ is the slope of the channel variation. Thus, Equation (22) can be simplified as:

$$Y(m) = \quad (26)$$
$$H(m)X(m) + \sum_{q=-Q, q \ne 0}^{Q} X(m+q)K((q)_M)H_{slope}((m+q)_M) + \tilde{N}(m),$$

where $$K((q)_M) = \frac{1}{M} \sum_{k=0}^{M-1} \left( k - \frac{M-1}{2} \right) e^{j2\pi \frac{kq}{M}}, \quad (27)$$

(i.e., the IFFT of $$\left( k - \frac{M-1}{2} \right)$$

), which can be pre-computed (e.g., stored in memory during manufacture of the receiver 110), and $$H_{slope}((m+q)_M) = \sum_{l=0}^{L-1} \alpha_l e^{-j2\pi \frac{(m+q)l}{M}}, \quad (28)$$

(i.e., $\hat{H}_{slope}$ is a channel slope estimate in the frequency domain). The module 305 is configured to estimate the CIR slope according to:

$$\hat{\alpha}_l = \frac{\hat{h}_l^C - \hat{h}_l^P}{M+G}, \quad (29)$$

where $\hat{H}_{slope}$ is $\hat{\alpha}_l$ expressed in the frequency domain. The module 305 is configured to provide the calculated information to the module 300.

The module 300 is configured to estimate the transmitted signal (e.g., the signal 125) using the information provided by the module 305 (e.g., ICI information). The module 300 is configured to estimate the transmitted signal (e.g., the signal 125) by subtracting the ICI information provided by the module 305 from the received signal (e.g., the signal 130) according to:

$$\hat{X}(m) = \frac{Y(m) - \sum_{q=-Q, q \ne 0}^{Q} \hat{X}(m+q)K((q)_M) \hat{H}_{slope}((m+q)_M)}{\hat{H}_{(m)}}, \quad (30)$$

where Q is a small integer (e.g., one or two, although other integers are possible).

The module 300 is configured to compute further iterations of Equation (30), which can improve performance of the final channel estimates. The module 300 is configured to perform frequency-domain MMSE channel estimation on the ICI-subtracted signal according to:

$$\hat{Y}(m) = Y(m) - \sum_{q=-Q, q \neq 0}^{Q} \hat{X}(m+q) K((q)_M) \hat{H}_{slope}((m+q)_M). \quad (31)$$

Additional iterations of ICI cancellation and/or addition MMSE equalization can be performed by the modules 300 and 305, if desired. Furthermore, the channel correlation computed by the module 300 using Equation (9) can be updated using Equation (12). The module 300 is configured to use Equations (30) and (31) to calculate the final channel estimates according to:

$$\hat{H}(m) = \frac{\hat{Y}(m)}{\hat{X}(m)}. \quad (32)$$

The module 300 is configured to store $\hat{H}(m)$ in the memory 315. For each sub-carrier of interest, the memory 315 can be configured to provide the final channel estimates to the processor 185 using Equation (32). Alternatively, the memory 315 can be configured such that the final channel estimates obtained from Equation (32) are stored in the memory and retrieved by the processor 185 when needed. Using the information provided by the processor 190, the processor 185 is configured to calculate a final estimate of the signal 130 by mapping received ones of the symbols 215 to corresponding constellation points (e.g., QPSK, 16 QAM, or 64 QAM constellations).

A Viterbi decoder can be used during the channel estimation process, to increase the accuracy of the calculated channel estimations, and to reduce the ICI between sub-carriers. For example, the module 300 is configured to analyze the output of Equation 23 using a Viterbi algorithm. The module 300 is further configured to encode the Viterbi decoded bits according to, e.g., the DVB-T/H standard, to obtain estimated transmitted signals (e.g., the signal 125) that are represented by constellation points. The module 300 is also configured to carry out ICI cancellation using the channel slope estimates obtained by analyzing, e.g., the hard and/or soft decisions using the Viterbi algorithm. When using a Viterbi decoder, the module 300 is configured to perform MMSE using the ICI subtracted signals to obtain additional channel estimates. The MMSE step that uses the ICI subtracted signals can be omitted to reduce the complexity of the channel estimation process.

Figure 5:
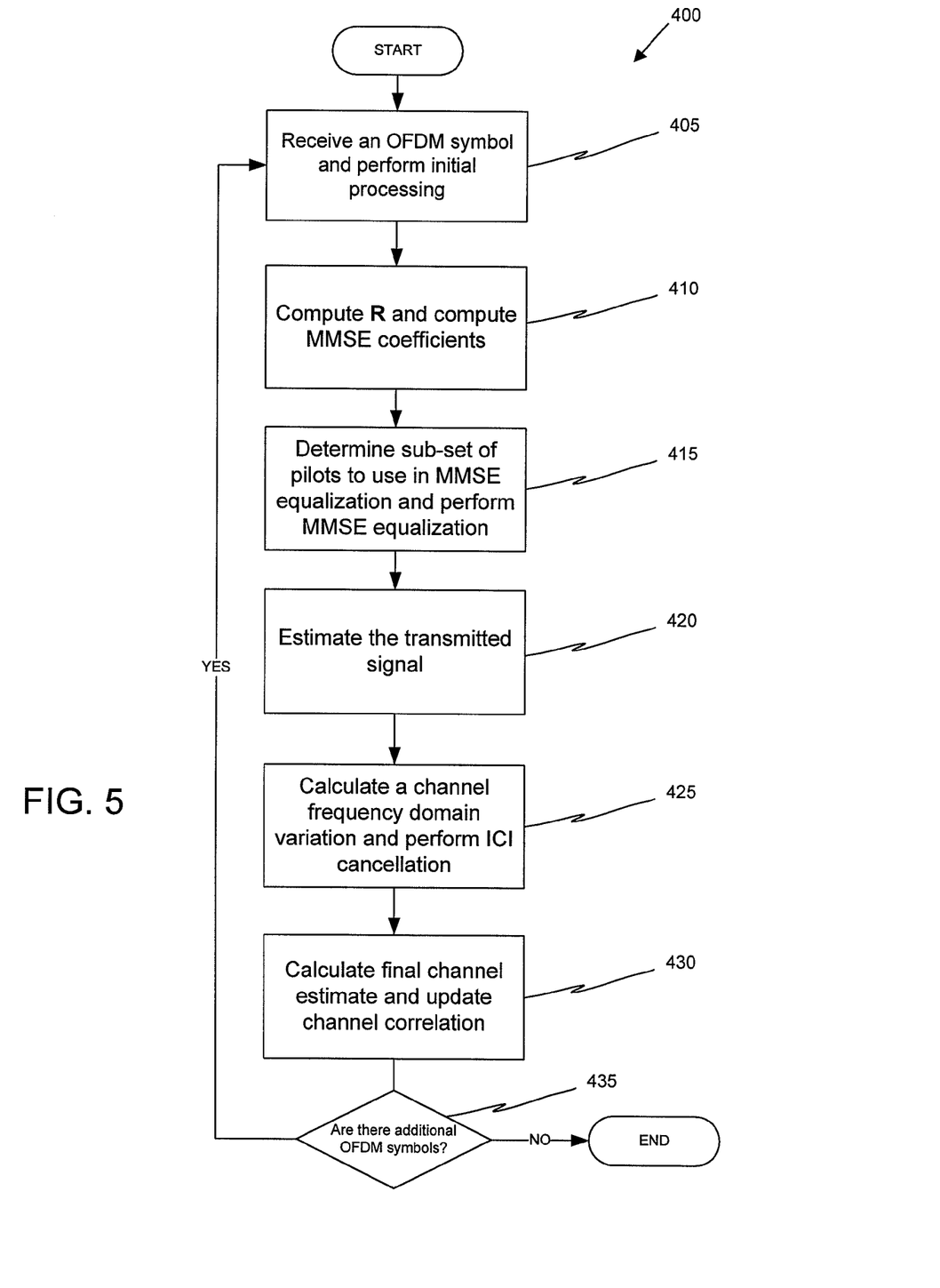
FIG. 5 is a flowchart of a process of performing channel estimation in the OFDM transmission system shown in FIG. 2.

In operation, referring to FIG. 5, with further reference to FIGS. 2-4, a process 400 for performing channel estimation using the system 100 includes the stages shown. The process 400, however, is exemplary only and not limiting. The process 400 can be altered, e.g., by having stages added, removed, or rearranged.

At stage 405, the receiver 110 receives the signal 125 (e.g., an OFDM DVB-T/H signal which has been transformed into the signal 130) transmitted by the transmitter 105 via the transmission channel 115. For each OFDM symbol set 210 received by the receiver 110, the S/P converter 170 converts the OFDM symbol set 210 into the parallel signal 172. Each stream (e.g., $172_1$ through $172_n$) corresponds to a different sub-carrier used to transmit the signal 125 via the transmission channel 115. The processor 175 receives the signal 172 from the S/P converter 170. The processor 175 removes the cyclic prefix added by the processor 160. The processor 175 provides the signal 177 to the processor 180. The processor 180 performs an FFT on the signal 177 converting it into the frequency domain signal 182. The processor 182 provides each OFDM symbol set 210 to the processors 185 and 190.

At stage 410, the processor 190 performs initial channel correlation estimation. The module 300 computes R, which corresponds to the received OFDM symbol set 210 and stores R in the memory 315. The module 300 calculates at least twelve sets of MMSE filter coefficients using Equation (11), each of the MMSE coefficient sets corresponding to a respective location of the data symbols 225 relative to surrounding pilot symbols 220. The module 300 stores the MMSE filter coefficients in the memory 315. The module 300 computes additional MMSE filter coefficients corresponding to sub-carriers near the lowest and highest frequencies used to transmit the signal 125. For the frame 205, depending on the configuration of the scattered pilot symbols 222 in the symbol set 210, the module 300 calculates four, seven, ten, or thirteen additional coefficients using Equation (11).

At stage 415, the module 300 determines the sub-set of pilots 220 to be used to calculate the channel estimates. For each of the data symbols 225 and TPS symbols 227, the module 300 determines if there are at least two of the scattered pilot symbols 222 between the sub-carrier used to transmit the symbol 215 under inspection and the lowest- and highest-frequency sub-carrier used to transmit the signal 125. If there are at least two of the scattered pilot symbols 222 between the sub-carrier used to transmit the symbol 215 under inspection and the highest- and lowest-frequency sub-carriers, then the module 300 chooses four pilot symbols 222 to use in MMSE equalization. For example, the module 300 chooses the two closest of the scattered pilot symbols 222 having a sub-carrier frequency lower than the symbol 215 under inspection, and the two closest of the scattered pilot symbols 222 having a sub-carrier frequency higher than the symbol 215 under inspection. For example, when calculating a channel estimate of the symbol 245, the module 300 selects pilot symbols 246, 247, 248, and 249. If the symbol 215 under inspection has less than two of the scattered pilot symbols 222 between the sub-carrier used to transmit the symbol under inspection and the lowest- or highest-frequency sub-carrier used to transmit the signal 125, then the module 300 selects the two closest pilots 222 (having a lower- or higher-frequency sub-carrier). For example, when determining which sub-set of pilots 222 to use when calculating a channel estimate for the symbol 253, the module selects the pilot symbols 246 and 247. The module 300 performs MMSE equalization on each of the symbols 215 under inspection using Equation (13) to obtain an initial channel estimate for each sub-carrier under inspection. More or fewer than two pilots 222 can be used to calculate an estimate of edge channels.

At stage 420, the module 300 calculates an estimate of the signal 125 using Equation (14) and the initial channel estimates calculated in stage 415. The module 300 replaces the estimated pilot symbols with the actual pilot symbols. The module 300 further refines the accuracy of the TPS symbol estimate by averaging all of the TPS symbols 227 in an OFDM symbol set 210 under inspection using Equation (15). The module 300 computes a channel estimate of the transmission channel 115 using the estimate of the signal 125 (having substituted pilot and TPS symbols) and Equation (16). The module 300 computes the updated channel correlation using Equation (17), which is stored in the memory 315. The module 300 further calculates the estimated average correlation using Equation (18).

At stage 425, the module 305 estimates and subtracts from the estimated signal (e.g., $\hat{X}(m)$) the frequency domain ICI present in the signal 130. The module 305 assumes that the time variation between two of the OFDM symbol sets 210 is linear and calculates the difference between the channel estimates of the OFDM symbol set 210 being received, and the channel estimates of the previous OFDM symbol set 210 received. The module 305 calculates the difference between the current and prior channel estimate using Equation (22). The module 300 uses the ICI information provided by the module 305 (e.g., either directly via the bus 310, or indirectly through the memory 315) to carry out MMSE channel estimation using the ICI-subtracted estimated signal using Equation (31). Additional iterations of ICI cancellation and/or additional MMSE equalization can be performed by the modules 300 and 305, if desired.

At stage 430, the module 300 calculates the final channel estimates of the transmission channel 115 and updates the channel correlation. The module 300 calculates the final channel estimates of the transmission channel 115 using Equation (32).

At stage 435, the processor 190 determines if the receiver 110 has received another OFDM symbol set 210. If yes, the process 400 returns to stage 405. Otherwise the process 400 terminates.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations. For example, while FIG. 4 shows a number of modules, each having been described as performing specific functions, the functionality provided by each of the modules can be combined into a single module and/or separated into additional modules. The receiver 110 can be configured to process multiple channel estimates at substantially the same time using parallel processing. While the memory 305 is shown as part of the processor 190, other configurations are possible (e.g., the memory 305 can be located in the processor 185, or located remotely via a network connection).

Referring to FIG. 5, the process 400 can be modified to accommodate a transmission channel that has a power profile that changes over time. For example, the process 400 can include stages where the correlation is based on the current channel estimate, and additional MMSE is carried out prior to applying ICI cancellation. Furthermore, the MMSE performed during stage 420 can be performed during stage 410 and channel correlation estimation can be moved from stage 430 to stage 410.

While the invention has been described in context of the DVB-T/H standard, where the spacing of the sub-carriers used to transmit the scattered pilot symbols 222 is twelve, other configurations are possible. For example, the invention can be adapted to work with transmission standards where the spacing of the sub-carriers used to transmit the scattered pilot symbols 222 is three.

While the processor 190 has been described as using the scattered pilot symbols 222, other pilot symbols can be used. For example, the processor 190 can use the continuous pilots 221, even if a selected one of the continuous pilots 221 does not coincide with a scattered pilot symbol 222. For example, referring to FIG. 3, the symbol 250 could be used to compute a channel estimate for a symbol 251. Using the continuous pilot symbols 221 that do not coincide with the scattered pilot symbols 222, however, can increase the complexity of the calculations performed by the processor 190 by, for example, adding additional terms to Equations (11) and (12).

While certain values and/or quantities have been described as calculated using one or more equations, other configurations are possible. For example, rather than calculating a specific value, the value can be pre-computed and retrieved from the memory 315.

While the invention has been described in the context of the broadcast of digital television, the invention can be used in other mobile or wireless channels such as cellular communication, satellite communication, satellite radio broadcast, terrestrial radio broadcast, wireless networking (e.g., WiFi), etc.

Further, while the description above refers to the invention, the description may include more than one invention.

What is claimed is:

1. A receiver for receiving an orthogonal frequency division multiplexed (OFDM) digital video broadcast (DVB) signal including OFDM symbol sets including data symbols and scattered pilot symbols transmitted using a plurality of sub-carriers, the OFDM DVB signal being transmitted toward the receiver via a transmission channel, the receiver comprising:
   an input module configured to receive the OFDM DVB signal via the transmission channel; and
   a channel estimation module coupled to the input module and configured to calculate channel estimates of the transmission channel by performing Fourier transforms on the OFDM symbol sets to produce transformed symbol sets in the frequency domain and by performing minimum mean square error (MMSE) equalization on the transformed symbol sets using a sub-set of the scattered pilot symbols in the OFDM DVB signal, at least one of the scattered pilot symbols being disposed at different sub-carrier positions in at least two symbol sets,
   wherein the channel estimation module is configured to perform the channel estimation for a data symbol by summing channel estimates corresponding to each of a respective one of the sub-set of pilot symbols, and
   where the sub-set of pilot symbols comprises more than two scattered pilot symbols of one OFDM symbol set.

2. The receiver of claim 1 wherein the channel estimation module performs a single Fourier transform per received OFDM symbol set.

3. The receiver of claim 1 wherein the sub-set of pilot symbols is substantially less than all of the pilot symbols in the one OFDM symbol set.

4. The receiver of claim 3 wherein the channel estimation module is configured to select, as the sub-set of pilot symbols, N closest pilot symbols transmitted using sub-carriers having frequencies lower than a frequency used to transmit a data symbol under inspection and N closest pilot symbols transmitted using sub-carriers having frequencies higher than the frequency used to transmit the data symbol under inspection.

5. The receiver of claim 3 wherein the channel estimation module is configured to select, as the sub-set of pilot symbols, N closest pilot symbols transmitted using sub-carriers having frequencies higher than a frequency used to transmit a data symbol under inspection.

6. The receiver of claim 3 wherein the channel estimation module is configured to select, as the sub-set of pilot symbols, N closest pilot symbols transmitted using sub-carriers having frequencies lower than a frequency used to transmit a data symbol under inspection.

7. The receiver of claim 1 wherein the channel estimation module calculates a channel estimate corresponding to each respective sub-carrier used to transmit each of the OFDM symbol sets.

8. The receiver of claim 1 wherein the channel estimation module is configured to calculate channel estimates of more than one of the data symbols in parallel.

9. The receiver of claim 4 wherein N is equal to two and the channel estimation module is configured to perform the channel estimation of each of the data symbols according to:

$$\hat{H}(m) = \sum_{p=1}^{4} c_p \hat{H}(m_p)$$

where $c_p$ is a respective filter coefficient, $\hat{H}(m_p)$ is a channel estimate for a respective one of the sub-set of pilot symbols, and p is an index value of a respective one of the sub-set of pilot symbols.

10. The receiver of claim 9 wherein the channel estimation module is configured to calculate filter coefficients according to:

$$\underline{c(m)} = [c_1(m)c_2(m)c_3(m)c_4(m)]$$
$$= [R((m-m_1)_M)R((m-m_2)_M)R((m-m_3)_M)$$
$$R((m-m_4)_M)]R^{-1}$$

where $$R = \begin{bmatrix} R(0) & R(M-12) & R(M-24) & R(M-36) \\ R(12) & R(0) & R(M-12) & R(M-24) \\ R(24) & R(12) & R(0) & R(M-12) \\ R(36) & R(24) & R(12) & R(0) \end{bmatrix} + \sigma^2 I,$$

and $$R(m) = \sum_{l=0}^{L-1} \sigma_l^2 e^{-j2\pi \frac{ml}{M}}, 0 \le m \le M-1$$

where M is a total number of sub-carriers present in the OFDM DVB signal, l is an index representing each respective path of a multi-path OFDM DVB signal, L is a number representing the delay spread of the channel, m is an integer value representing a quantity of intervening channels between two selected channels of which correlation is being calculated, and $$E\{|h_l(k)|^2\} = \sigma_l^2$$

where $h_l(k)$ is the channel impulse response at time k of the $l^{th}$ path of the transmission channel.

11. The receiver of claim 1 wherein the channel estimation module is configured to calculate an interchannel interference (ICI) value, in the frequency domain, related to the transmission channel.

12. The receiver of claim 11 wherein the channel estimation module is configured to perform the channel estimation using the ICI value.

13. The receiver of claim 12 wherein the channel estimation module is configured to perform MMSE equalization after subtracting the ICI value from the received OFDM DVB signal.

14. The receiver of claim 1 wherein the channel estimation module is configured to calculate channel estimates by estimating a channel correlation value according to:

$$\tilde{R}(m) = \frac{1}{K} \sum_{(k_2-k_1)_M = m} \hat{H}^*(k_1)\hat{H}(k_2),$$

where K is the number of cases that satisfy $(k_2-k_1)_M = m$ and M is a total number of sub-carriers present in the OFDM DVB signal.

15. The receiver of claim 14 wherein the estimated channel correlation value is averaged according to:

$$\hat{R}(m) = (1-\beta)\hat{R}(m) + \beta\tilde{R}(m),$$

where $\beta$ is a predetermined known parameter.

16. The receiver of claim 1 wherein the channel estimation module is configured to use a Viterbi decoder.

17. A method for computing channel estimates of a transmission channel used to transmit an orthogonal frequency division multiplexed (OFDM) digital video broadcast (DVB) signal including OFDM symbol sets including data symbols and scattered pilot symbols transmitted using a plurality of sub-carriers, the method comprising:
 receiving the OFDM DVB signal at a receiver via a transmission channel; and
 calculating channel estimates of the transmission channel in the frequency domain by
  performing Fourier transforms on OFDM symbol sets to produce transformed symbols sets in the frequency domain and by
  performing minimum mean square error (MMSE) equalization on the transformed symbol sets using a sub-set of the scattered pilot symbols in the OFDM DVB signal, where at least one of the scattered pilot symbols is disposed at different sub-carrier positions in at least two symbol sets,
 wherein calculating channel estimates includes calculating a channel estimate for a data symbol by summing channel estimates corresponding to each of a respective one of the sub-set of pilot symbols, and
 wherein the sub-set of pilot symbols comprises more than two scattered pilot symbols of one OFDM symbol set.

18. The method of claim 17 wherein calculating channel estimates includes calculating channel estimates by performing a single Fourier transform per received OFDM symbol set.

19. The method of claim 17 further comprising selecting, as the sub-set of pilot symbols, N closest pilot symbols transmitted using sub-carriers having frequencies lower than a frequency used to transmit a data symbol under inspection and N closest pilot symbols transmitted using sub-carriers having frequencies higher than the frequency used to transmit the data symbol under inspection.

20. The method of claim 18 further comprising selecting, as the sub-set of pilot symbols, N closest pilot symbols transmitted using sub-carriers having frequencies lower than a frequency used to transmit a data symbol under inspection.

21. The method of claim 18 further comprising selecting, as the sub-set of pilot symbols, N closest pilot symbols transmitted using sub-carriers having frequencies higher than a frequency used to transmit a data symbol under inspection.

22. The method of claim 17 wherein calculating channel estimates includes calculating channel estimates of more than one of the data symbols in parallel.

23. The method of claim 19 wherein calculating the channel estimates includes calculating the channel estimate of a data symbol of interest with N being equal to two and according to:

$$\hat{H}(m) = \sum_{p=1}^{4} c_p \hat{H}(m_p)$$

where $c_p$ is a respective filter coefficient, $\hat{H}(m_p)$ is a channel estimate for a respective one of the sub-set of pilot symbols, and p is an index value of a respective one of the sub-set of pilot symbols.

24. The method of claim 23 wherein calculating the channel estimates includes calculating filter coefficients according to:

$$\underline{c(m)} = [c_1(m)c_2(m)c_3(m)c_4(m)]$$
$$= [R((m-m_1)_M)R((m-m_2)_M)R((m-m_3)_M)$$
$$R((m-m_4)_M)]R^{-1}$$

where $$R = \begin{bmatrix} R(0) & R(M-12) & R(M-24) & R(M-36) \\ R(12) & R(0) & R(M-12) & R(M-24) \\ R(24) & R(12) & R(0) & R(M-12) \\ R(36) & R(24) & R(12) & R(0) \end{bmatrix} + \sigma^2 I,$$

and $$R(m) = \sum_{l=0}^{L-1} \sigma_l^2 e^{-j2\pi \frac{ml}{M}}, 0 \le m \le M-1$$

where M is a total number of sub-carriers present in the OFDM DVB signal, l is an index representing each respective path of a multi-path OFDM DVB signal, L is a number representing the delay spread of the channel, m is an integer value representing a quantity of intervening channels between two selected channels of which correlation is being calculated, and $$E\{|h_l(k)|^2\} = \sigma_l^2$$

where $h_l(k)$ is the channel impulse response at time k of the $l^{th}$ path of the transmission channel.

25. The method of claim 17 wherein calculating channel estimates includes calculating a channel estimate corresponding to each respective sub-carrier used to transmit the OFDM DVB signal.

26. The method of claim 17 further comprising calculating an interchannel interference (ICI) value, in the frequency domain, related to the transmission channel.

27. The method of claim 26 wherein calculating the channel estimates includes calculating channel estimates of the transmission channel using the ICI value.

28. The method of claim 27 wherein calculating the channel estimates includes performing MMSE equalization after subtracting the ICI value from the OFDM DVB signal.

29. The method of claim 17 wherein calculating channel estimates further includes calculating channel estimates by estimating a channel correlation value according to:

$$\tilde{R}(m) = \frac{1}{K} \sum_{(k_2-k_1)_M = m} \hat{H}^*(k_1)\hat{H}(k_2),$$

where K is the number of cases that satisfy $(k_2-k_1)_M=m$ and M is a total number of sub-carriers present in the OFDM DVB signal.

30. The method of claim 29 wherein calculating channel estimates further includes averaging the estimated channel correlation value according to:

$$\hat{R}(m) = (1-\beta)\hat{R}(m) + \beta\tilde{R}(m),$$

where $\beta$ is a predetermined known parameter.

31. The method of claim 17 wherein calculating channel estimates further includes performing Viterbi decoding.

32. The method of claim 17 further comprising selecting, as the sub-set of pilot symbols, four closest scattered pilot symbols.

33. The method of claim 17, wherein the scattered pilot symbols are spaced apart by a predetermined number B of sub-carriers, and wherein the method further comprises calculating B+1 MMSE coefficients for each of the OFDM symbol sets.

34. The method of claim 33 further comprising calculating one or more additional MMSE coefficients for one or more of the OFDM symbol sets, wherein the number of additional MMSE coefficients is equal to the number of sub-carriers between an initial pilot symbol and a first scattered pilot symbol plus one.

35. The method of claim 33, wherein B+1 equals twelve.

36. The receiver of claim 1, wherein the channel estimation module is configured to select, as the sub-set of pilot symbols, four closest scattered pilot symbols.

37. The receiver of claim 1, wherein the scattered pilot symbols are spaced apart by a predetermined number B of sub-carriers, and wherein the channel estimation module is configured to calculate B+1 MMSE coefficients for each of the OFDM symbol sets.

38. The receiver of claim 37, wherein the channel estimation module is further configured to calculate one or more additional MMSE coefficients for one or more of the OFDM symbol sets, wherein the number of additional MMSE coefficients is equal to the number of sub-carriers between an initial pilot symbol and a first scattered pilot symbol plus one.

39. The receiver of claim 37, wherein B+1 equals twelve.

40. An apparatus for computing channel estimates of a transmission channel used to transmit an orthogonal frequency division multiplexed (OFDM) digital video broadcast (DVB) signal including OFDM symbol sets including data symbols and scattered pilot symbols transmitted using a plurality of sub-carriers, the apparatus comprising:
   means for receiving the OFDM DVB signal via a transmission channel; and
   means for calculating channel estimates of the transmission channel in the frequency domain, the means for calculating comprising:
      means for performing Fourier transforms on OFDM symbol sets to produce transformed symbols sets in the frequency domain; and
      means for performing minimum mean square error (MMSE) equalization on the transformed symbol sets using a sub-set of the scattered pilot symbols in the OFDM DVB signal, where at least one of the scattered pilot symbols is disposed at different sub-carrier positions in at least two symbol sets; and
      means for calculating a channel estimate for a data symbol by summing channel estimates corresponding to each of a respective one of the sub-set of pilot symbols,
   wherein the sub-set of pilot symbols comprises more than two scattered pilot symbols of one OFDM symbol set.

41. The apparatus of claim 40, wherein the means for calculating channel estimates comprises a hardware channel estimation module.

42. The apparatus of claim 40 further comprising means for calculating an interchannel interference (ICI) value, in the frequency domain, related to the transmission channel.

43. The apparatus of claim 42 further comprising means for subtracting the ICI value from the received OFDM DVB signal.

44. The apparatus of claim 42, wherein the means for calculating an ICI value comprises a channel frequency domain variation calculation module connected by a bus to a channel estimation, channel correlation, and MMSE module.

45. A non-transitory medium having computer-readable instructions for computing channel estimates of a transmission channel used to transmit an orthogonal frequency division multiplexed (OFDM) digital video broadcast (DVB) signal including OFDM symbol sets including data symbols and scattered pilot symbols transmitted using a plurality of sub-carriers, wherein when the instructions are executed by a computer the instructions cause the computer to:

receive the OFDM DVB signal at a receiver via a transmission channel; and     calculate channel estimates of the transmission channel in the frequency domain by:

performing Fourier transforms on OFDM symbol sets to produce transformed symbols sets in the frequency domain; and         performing minimum mean square error (MMSE) equalization on the transformed symbol sets using a sub-set of the scattered pilot symbols in the OFDM DVB signal, where at least one of the scattered pilot symbols is disposed at different sub-carrier positions in at least two symbol sets; and         calculating a channel estimate for a data symbol by summing channel estimates corresponding to each of a respective one of the sub-set of pilot symbols, wherein the sub-set of pilot symbols comprises more than two scattered pilot symbols of one OFDM symbol set.

* * * * *